(12) United States Patent
Jason et al.

(10) Patent No.: US 7,536,674 B2
(45) Date of Patent: May 19, 2009

(54) METHOD AND SYSTEM FOR CONFIGURING NETWORK PROCESSING SOFTWARE TO EXPLOIT PACKET FLOW DATA LOCALITY

(75) Inventors: James L. Jason, Hillsboro, OR (US); Aaron R. Kunze, Portland, OR (US); Erik J. Johnson, Portland, OR (US); Harrick Vin, Austin, TX (US); Ravi Sahita, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 634 days.

(21) Appl. No.: 10/639,501

(22) Filed: Aug. 13, 2003

(65) Prior Publication Data

US 2005/0038937 A1  Feb. 17, 2005

(51) Int. Cl.
 G06F 9/44 (2006.01)
 G06F 9/445 (2006.01)
(52) U.S. Cl. .................... 717/106; 717/172; 717/177
(58) Field of Classification Search ............. 717/106, 717/172, 177, 135; 709/201, 202, 217–221, 709/230–234, 236, 246, 238, 245
See application file for complete search history.

(56) References Cited

U.S. PATENT DOCUMENTS

| | | | | |
|---|---|---|---|---|
| 5,008,814 A * | 4/1991 | Mathur | ................ | 709/221 |
| 5,166,674 A * | 11/1992 | Baum et al. | ................ | 714/752 |
| 5,187,789 A | 2/1993 | O'Hair | | |
| 5,313,582 A * | 5/1994 | Hendel et al. | ................ | 710/56 |
| 5,434,976 A * | 7/1995 | Tan et al. | ................ | 709/234 |
| 5,522,039 A * | 5/1996 | Snyder et al. | ................ | 714/52 |
| 5,598,410 A * | 1/1997 | Stone | ................ | 370/469 |
| 5,602,995 A * | 2/1997 | Hendel et al. | ................ | 711/209 |
| 5,659,754 A | 8/1997 | Grove | | |
| 5,752,078 A * | 5/1998 | Delp et al. | ................ | 710/7 |
| 5,845,329 A * | 12/1998 | Onishi et al. | ................ | 711/157 |
| 5,862,344 A * | 1/1999 | Hart | ................ | 709/238 |
| 5,903,724 A * | 5/1999 | Takamoto et al. | ................ | 709/200 |
| 6,018,770 A * | 1/2000 | Little et al. | ................ | 709/223 |
| 6,065,037 A * | 5/2000 | Hitz et al. | ................ | 709/200 |
| 6,065,046 A * | 5/2000 | Feinberg et al. | ................ | 709/216 |
| 6,275,981 B1 | 8/2001 | Buzbee | | |
| 6,289,505 B1 | 9/2001 | Goebel | | |
| 6,339,803 B1 * | 1/2002 | Glassen et al. | ................ | 710/52 |
| 6,424,989 B1 * | 7/2002 | Shaw et al. | ................ | 709/201 |
| 6,714,997 B1 * | 3/2004 | Brice et al. | ................ | 710/8 |
| 6,874,140 B1 | 3/2005 | Shupak | | |
| 7,146,478 B2 * | 12/2006 | Herkerdorf et al. | ................ | 711/167 |
| 7,360,202 B1 * | 4/2008 | Seshadri et al. | ................ | 717/106 |

(Continued)

OTHER PUBLICATIONS

Alfred V. Aho, "Compilers Principles, Techniques, and Tools", 1988, Addison-Wesley, pp. 1-15.*

(Continued)

*Primary Examiner*—Wei Y. Zhen
*Assistant Examiner*—Anna Deng
(74) *Attorney, Agent, or Firm*—Grossman, Tucker, Perreault & Pfleger, PLLC (57) ABSTRACT

Embodiments of the present invention relate to a method and system for automatically configuring network processing software to reduce memory latency associated with parallel processing using a plurality of processing elements.

16 Claims, 6 Drawing Sheets

U.S. PATENT DOCUMENTS

| | | | |
|---|---|---|---|
| 7,373,290 B2 * | 5/2008 | Gabele et al. | 703/21 |
| 7,386,838 B2 | 6/2008 | Schmidt | |
| 2002/0133491 A1 * | 9/2002 | Sim et al. | 707/10 |
| 2003/0051234 A1 | 3/2003 | Schmidt | |
| 2003/0051236 A1 * | 3/2003 | Pace et al. | 717/177 |
| 2003/0154469 A1 | 8/2003 | Anderson | |
| 2003/0167458 A1 | 9/2003 | Santhanam | |
| 2004/0037313 A1 * | 2/2004 | Gulati et al. | 370/465 |
| 2004/0073899 A1 | 4/2004 | Luk | |

OTHER PUBLICATIONS

Erramilli et al. "Experimental queueing analysis with long-range dependent packet traffic", Apr. 1996, IEEE Press, vol. 4, Issue 2, pp. 209-223.*

Manku et al. "Approximate frequency counts over data streams" Aug. 2002, VLDB Endowment, pp. 1-12.*

Jones et al. "Parallel execution of a sequential netowrk simulator" Dec. 2000, Society for Computer Simulation International, pp. 418-424.*

Berndl, et al., "Dynamic Profiling and Trace Cache Generation for a Java Virtual Machine," McGill University School of Computer Science Sabel Research Group, Oct. 17, 2002; 20 pages.

Mantripragada, et al. "Selective Guarded Execution Using Profiling on a Dynamically Scheduled Processor," Dec. 2000; Abstract 1 page.

Zilles, et al. "A Programmable Co-Processor for Profiling", International Symposium on High Performance Computer Architecture, Jan. 2001; 21 pages.

* cited by examiner

METHOD AND SYSTEM FOR CONFIGURING NETWORK PROCESSING SOFTWARE TO EXPLOIT PACKET FLOW DATA LOCALITY

BACKGROUND OF THE INVENTION

Information traffic in computer networks may comprise data packets. Often, packets may be characterized as belonging to this or that particular "flow"; a flow of packets is a sequence or group of packets that are in some way related. For example, they may be associated with the same sender and receiver. Traffic passing through a network device such as a bridge or router may comprise a plurality of distinct packet flows.

A network device may comprise network processors that execute network-processing software. A network processor may include a plurality of processing elements or units capable of processing packets in parallel, which helps to increase traffic throughput. There exist a number of different implementations of network software that uses multiple processing elements to perform packet processing in parallel. However, some implementations of the network software may be less efficient than others. For example, some implementations are hampered by contention for shared resources, such as shared memory and data structures, and the need for time-consuming accesses to shared resources.

More efficient implementations are known which, for example, take advantage of observed tendencies in packet processing behavior. More specifically, the more efficient software may exploit a phenomenon referred to herein as "packet flow data locality." Packet flow data locality is a term that refers to a tendency for the processing of packets from the same flow to access the same area of memory, while the processing of packets from another, different flow accesses a different, disjoint area of memory. Using packet flow data locality, it is possible to, for example, reduce contention for shared resources, and to realize other efficiencies described in more detail further on.

However, coding software to exploit packet flow data locality typically requires detailed knowledge of a particular processor architecture and of packet flow behavior. Accordingly, typical implementations of network software may be unduly inefficient in at least the aspect of parallel packet processing because of the expense or effort and programming skill required to code more efficient implementations. Thus, it would be useful and improve network software in general to reduce the effort of coding software that takes advantage of packet flow data locality in parallel processing of multiple packet flows.

DETAILED DESCRIPTION

Embodiments of the present invention relate to a method and system for automatically configuring network processing software to increase its efficiency by reducing memory latency associated with parallel processing using a plurality of processing elements. More specifically, the embodiments may comprise code analyzer and modifier software configured to receive network processing code as input and produce modified network processing code as output. The modified network processing code may, in particular, be adapted to implement a particular distribution of packet-flow-specific data structures, i.e., data structures created and used in the processing of specific packet flows. The distribution may, among other things, reduce time-consuming accesses by the plurality of processing elements to external shared memory, and reduce contention for the shared memory among the plurality of processing elements.

The speed of networks is fast increasing, due, among other things, to advances in the technology of the physical network medium. One measure of network speed is inter-packet arrival time: that is, the time between packet arrivals at some point in a network. Inter-packet arrival times have been steadily decreasing, placing greater demands on network processing. One way in which the increasing demands of network processing have been handled is through the increased use of parallel processing using multiple processing elements.

Figure 1:
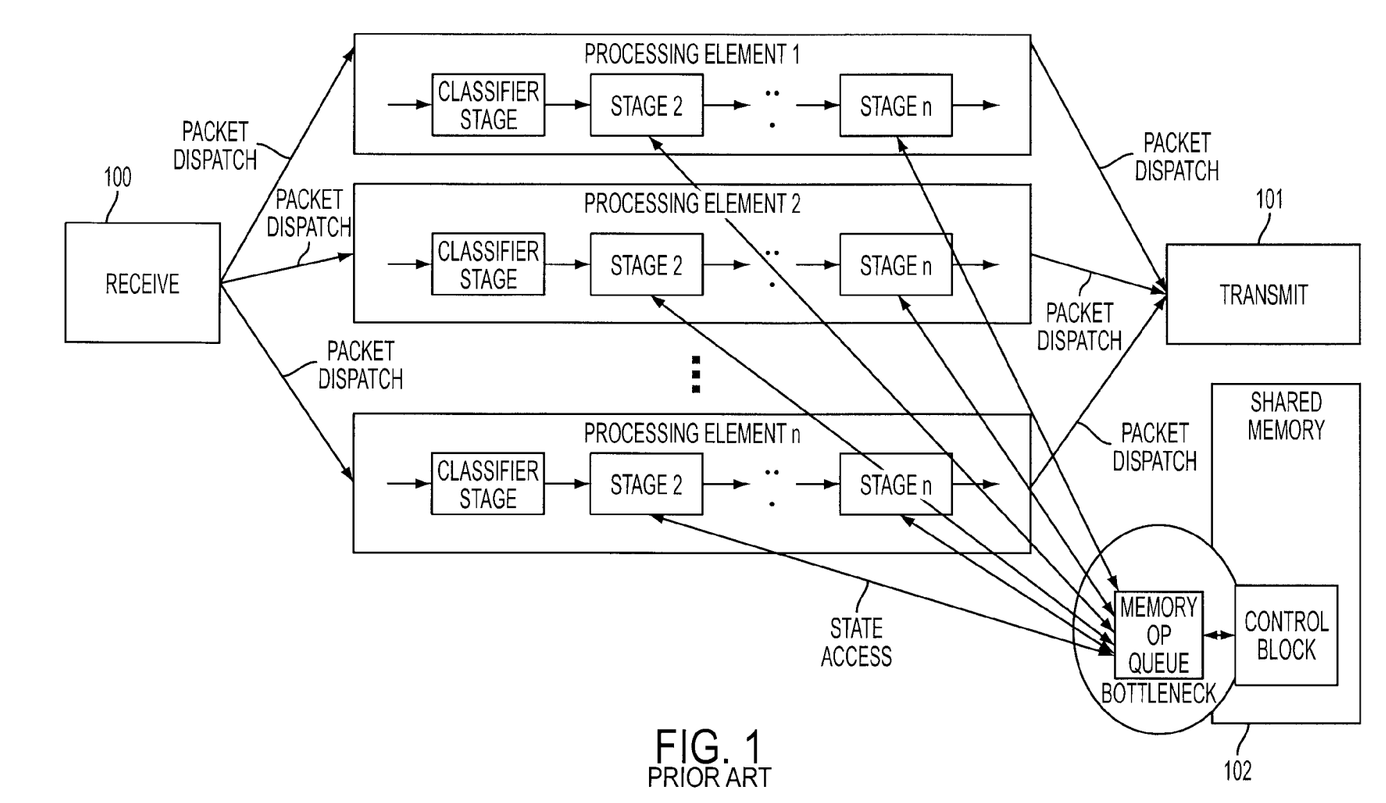
FIG. 1 shows an example of a configuration of a network processor comprising a plurality of processing elements, wherein inefficiencies may exist due at least in part to contention for shared resources.

FIG. 1 shows one example of a typical implementation of parallel processing of packets using multiple processing elements. In FIG. 1, a receive element 100 of a network processor is shown receiving and dispatching packets to a plurality of processing elements 1 though n. Each processing element may comprise a classifier stage and 2 through n additional stages. When a packet arrives at a receive element 100, the receive element may assign it to the next available processing element. The classifier stage of the processing element may initially perform a classification that results in the packet being assigned an identifier (for example, a flow ID) that remains with the packet while it is being processed. The identifier may be used to enable subsequent processing stages to perform quick O(1) (a notation known in the art, representing the efficiency of an algorithm) data structure look-ups for packet-flow-specific data structures. After being processed by a processing element, a packet may be dispatched to a transmit element 101 and sent further on toward its destination. Software packet-processing operations may be executed in parallel on the plurality of processing elements, allowing multiple packets to be processed simultaneously, and thus increasing network throughput and helping a processor to keep up with the underlying network speed.

However, FIG. 1 further illustrates inefficiencies associated with memory accesses that can exist in typical network processing implementations. More specifically, processing of a packet may require access to a processor-element-external shared memory 102 and associated control blocks. Current memory latencies (the time needed to perform a memory access to an external shared memory such as memory 102) in network processors are comparable to the inter-packet arrival time. In other words, in about the time it takes to complete one memory access associated with processing a received packet, a new packet has arrived. However, as the associated technologies progress, inter-packet arrival times are decreasing at a faster rate than memory access latency is decreasing.

Because, among other factors, most network processing requires more than one memory access, the increasing speed of network traffic calls for correspondingly decreasing memory latencies. Notwithstanding this need, the configuration shown in FIG. 1 has disadvantages with respect to accessing the external shared memory 102 which generally do not favor decreased memory latency.

More specifically, because the processing of packets is performed in parallel, packets from the same flow may be processed simultaneously by different processing elements. This requires flow-specific data structures to be instantiated at some level of the shared memory 102 hierarchy, necessitating the use of an inter-processing-element mechanism (such as locks) to synchronize access to these data structures. This leads to contention for (1) the memory 102 used to hold the shared data structures or the synchronization mechanisms controlling access to them; and (2) the memory buses to the shared memory. This contention may result in the shared memory becoming a bottleneck as shown in FIG. 1, as well as adding processing overhead.

Figure 2:
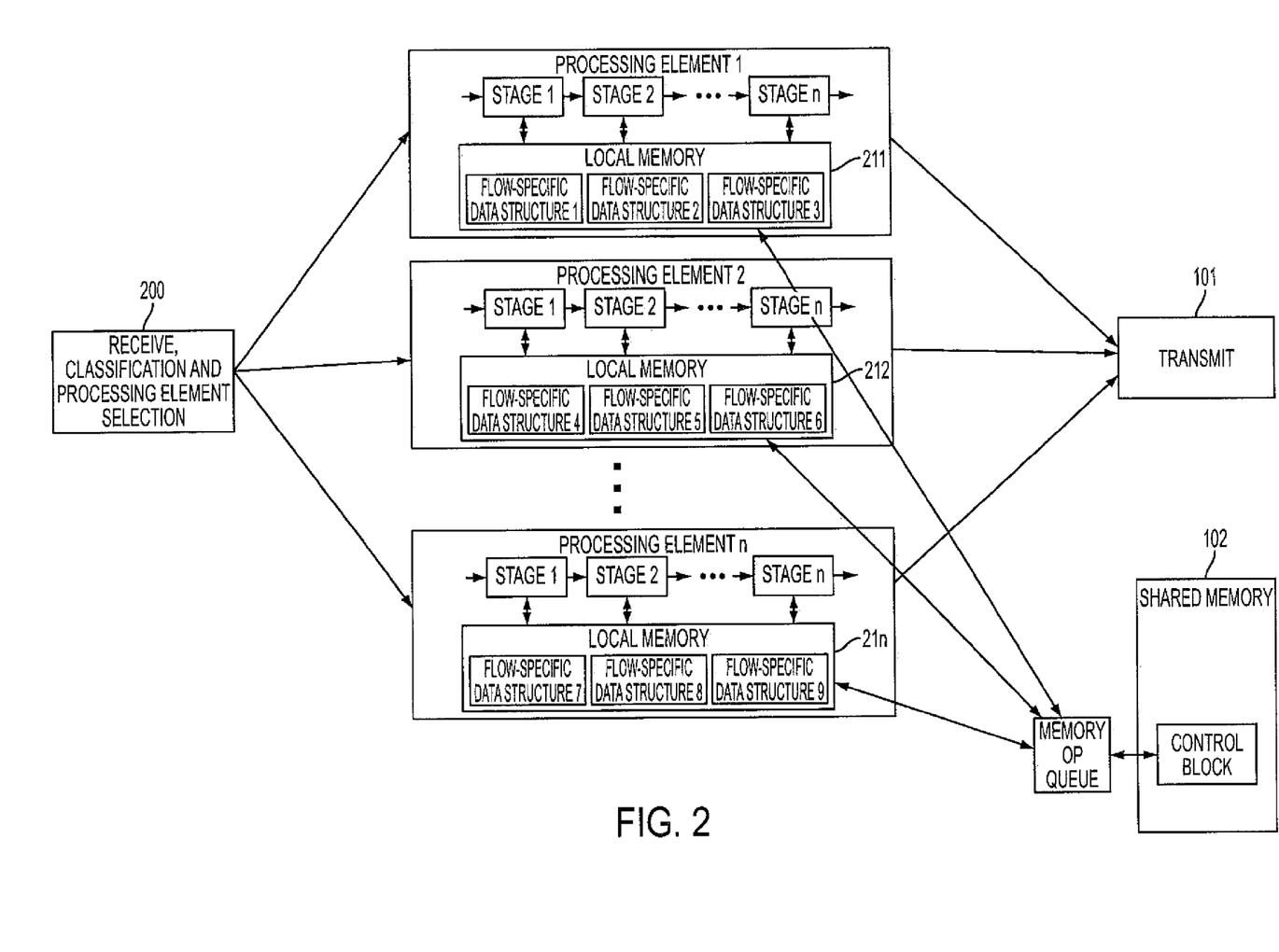
FIG. 2 shows an example of a configuration of a network processor comprising a plurality of processing elements which may be more efficient due at least in part to reduced contention for shared resources as compared to the arrangement of FIG. 1.

By contrast, FIG. 2 shows a configuration that takes advantage of packet flow data locality to reduce memory latency. In FIG. 2, data structures used in packet processing may be organized so that that only one processing element handles the data structures associated with a specific flow. More specifically, non-overlapping flow-specific data structures may be stored in respective local memories 211, 212, . . . , 21n of the processing elements 1, 2, . . . n. For example, in FIG. 2, flow-specific data structures 1 (i.e., data structures specific to a packet flow classified or identified by the identifier "1") are restricted to the local memory 211 of processing element 1, as are flow-specific data structures 2 and 3. Similarly, flow-specific data structures 4, 5 and 6 are restricted to the local memory 212 of processing element 2, and so on. In embodiments, the local memories may be caches. The flow-specific data structures may be distributed across the respective local memories of the processing elements so as to spread the processing workload evenly among the processing elements.

By restricting flow-specific or "per-flow" data structures to respective single processing elements as described, it may be ensured that no two or more different processing elements process packets from the same flow. Thus, because with packet flow data locality, most data structures needed to process a particular flow will be present in a single processor's local memory, the restricting may reduce the need for time-consuming accesses to the external shared memory 102, and thus reduce contention between processing elements for access to data structures stored in external shared memory. More specifically, the arrangement shown in FIG. 2 may reduce memory latency, among other ways, by: (1) replacing inter-processing element synchronization mechanisms on shared memory with faster intra-processing-element synchronization mechanisms (or even potentially removing any need for such synchronization); (2) allowing per-flow data structures to be cached on faster processing-element local memory; and (3) reducing the contention for shared memory and its corresponding buses.

Referring to FIG. 2, a function block 200 represents the device(s)/software for performing the operations of receiving, classifying and selecting a processing element for an arriving packet. Thus, the classification stage, rather than being replicated across processing elements as in FIG. 1, may instead become a generic or common classification stage performed by a single processing element. As part of the classification, block 200 may assign a flow ID to an arriving packet. Once the packet is classified by flow ID, block 200 may further select a processing element to process the packet. Moreover, block 200 may ensure that packets belonging to the same flow are assigned to the same processing element.

Figure 3:
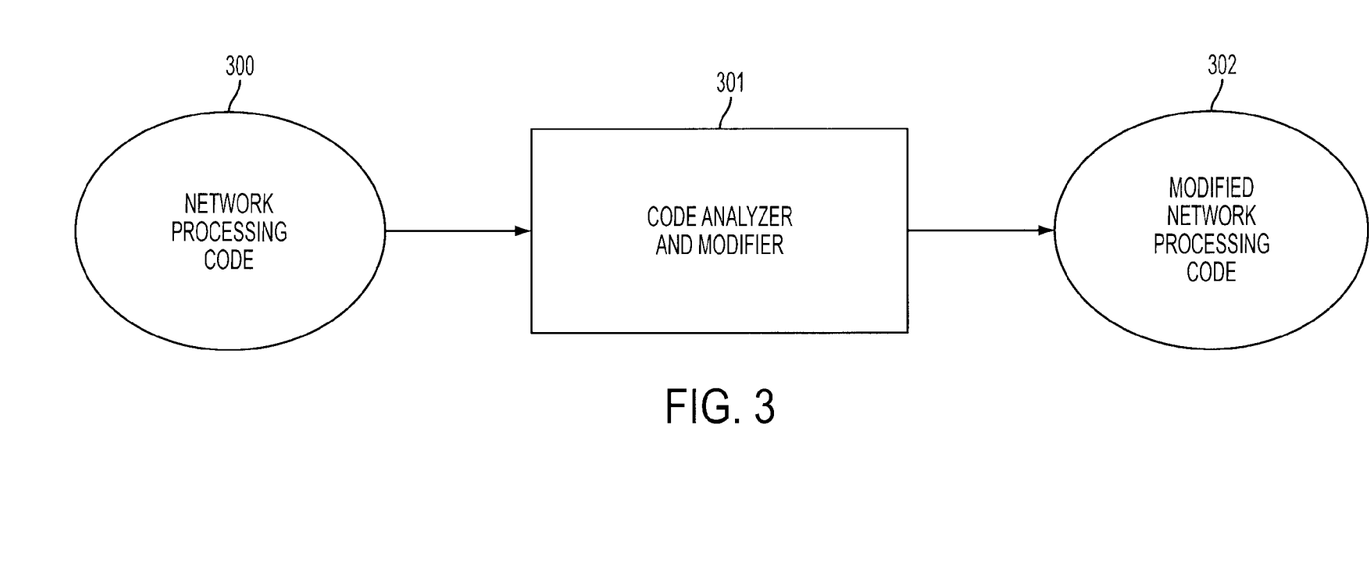
FIG. 3 shows a high-level process flow according to embodiments of the present invention.

In view of the foregoing, embodiments of the present invention relate to automatically configuring network processing software to perform operations in association with implementing a system as shown in FIG. 2. FIG. 3 shows a high-level view of a process according to embodiments of the invention. As shown in FIG. 3, network processing code 300 may be input to a code analyzer and modifier 301, to produce modified network processing code 302. More specifically, the network processing code 300 may be code used for packet handling in a network device that receives a plurality of packet flows; examples include token bucket meter, RED ("Random Early Detection"), WRED ("Weighted Random Early Detection"), or combinations of these programs. Such programs are well known in the art and typically involve packet handling decisions such as drop, mark, or enqueue decisions. The code analyzer and modifier 301 may be configured to receive the network processing code 300 as input, analyze it according to considerations described in more detail further on, and modify it so that it implements processing according to the model shown in FIG. 2.

Figure 4:
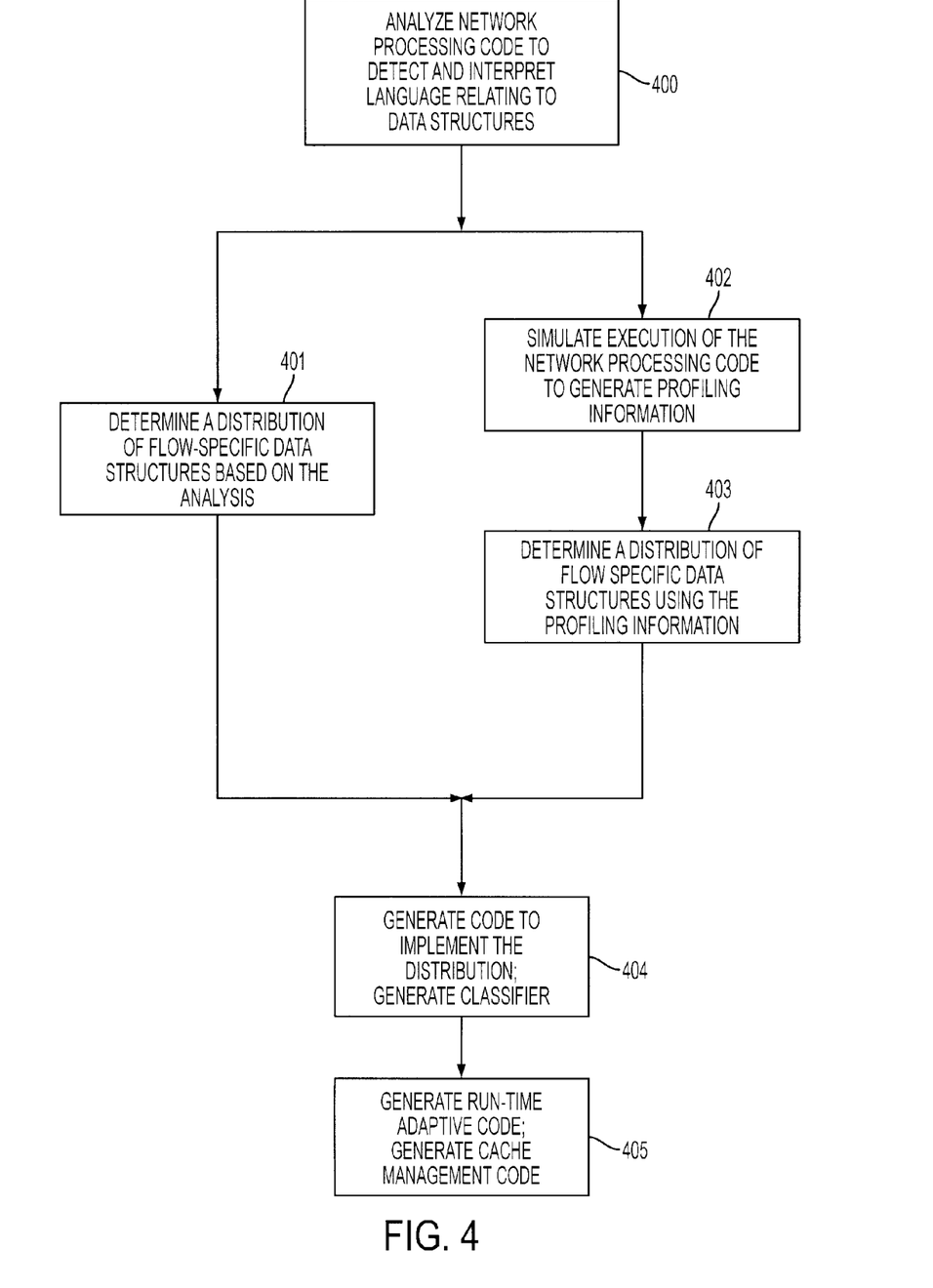
FIG. 4 shows a flowchart of operations according to embodiments of the invention.

FIG. 4 shows a flowchart of operations which may be performed by the code analyzer and modifier 301 according to embodiments of the invention. As shown in block 400 of FIG. 4, network processing code 300, which could be in the form of source code, may be analyzed to detect and interpret language that creates data structures used in network processing, and to determine how the data structures are accessed. To this end, as described in more detail further on, the network processing code 300 could be written in a network processing domain-specific language (DSL) containing data structure "intrinsics" that are commonly used in network processing. The code analyzer and modifier 301 may, accordingly, comprise a compiler able to recognize such intrinsics and understand, from the semantics of the DSL, how the data structures are accessed. An example of a flow-specific data structure and associated access method that could be detected is a table indexed by flow ID.

As shown in block 401, based on the foregoing analysis, a distribution of the flow-specific data structures across the respective local memories of a plurality of processing elements of a network processor may be determined. More specifically, the distribution may be designed to restrict processing of each distinct flow to a particular processing element, along the lines described earlier. For example, the distribution may ensure that no two local memories respectively associated with distinct processing elements store flow-specific data structures associated with the same flow. Further, the distribution may be designed to spread a processing workload evenly across the plurality of processing elements.

For example, the flow-specific data structures and associated access method detected in the network processing code 300 by the code analyzer and modifier 301 could be table entries in a table indexed by flow ID. A number E of table entries could be known, and a number P of processing elements could be known. In determining a distribution of the table, a number E/P of table entries could be assigned or allocated to the local memory of a first processing element. In the subsequent actual execution of modified network processing code 302, the E/P entries allocated in the local memory of the first processing element could be used for packets of a first E/P flow IDs. Similarly, a number E/P of table entries could be assigned or allocated to the local memory of a second processing element, and E/P entries corresponding to a second E/P flow IDs could be stored in the local memory of the second processing element, and so on. In alternative embodiments, the table could be "striped," such that every Pth entry was assigned to the local memory of a first processing element, every (P+1)th entry was assigned to the local memory of a second processing element, and so on.

According to embodiments, processing may then proceed, as shown in FIG. 4, to block 404, wherein code may be generated by the code analyzer and modifier 301 to implement the distribution determined according to the foregoing considerations.

On the other hand, according to further embodiments, a distribution of flow-specific data structures may be determined using "profiling" information relating to accesses to the data structures. The distribution determined using profiling information may better reflect actual processing conditions. To generate the profiling information, the network processing code 300 may be processed to place it into an intermediate representation. The intermediate representation may have a syntax which allows execution of the corresponding program to be simulated using simulation software.

As shown in block 402, the intermediate representation may then be processed by simulation software to simulate execution of the network processing code 300 corresponding to the intermediate representation, and, through the simulation, to generate the profiling information. The profiling information may include, for example, information relating to how, what areas of, and how frequently the flow-specific data structures are accessed pursuant to the processing of packets. The simulation may receive, as input, representative packet trace and state information. The packet trace and state information may be used, for example, to simulate the arrival of packets from the network and to set up the initial state (e.g., values in the data structures, etc.) of the system being simulated.

Then, as shown in block 403, a distribution of the flow-specific data structures across the respective local memories of a plurality of processing elements of a network processor may be determined, using the profiling information. As with the distribution determined as illustrated by block 401, the distribution determined using the profiling information may be designed to restrict processing of each distinct flow to a particular processing element. For example, the distribution may ensure that no two local memories respectively associated with distinct processing elements store flow-specific data structures associated with the same flow. Further, the distribution may be designed to spread a processing workload evenly across the plurality of processing elements. Spreading the workload evenly could involve using the profiling information relating to the frequency of accesses to the data structures. For example, the profiling information could indicate that one or more table entries were being accessed more frequently than others. To account for this, the more frequently accessed table entries might be respectively assigned to the local memories of disparate processing elements, to ensure that no one processing element was overburdened.

After determining a distribution of flow-specific data structures, code may be automatically generated to implement the distribution, as shown in block 404. The modified network processing code 302, accordingly, may include logic to implement the original network processing logic contained in the original or unmodified network processing code 300, as well as new code generated by the code analyzer and modifier 301 to effect the distribution. The code analyzer and modifier 301 may further generate code for implementing a common classifier, as described above, to distribute arriving packets to appropriate processing elements, based upon which corresponding local memory stores the flow-specific data structures associated with the flow to which a packet belongs. More specifically, this classifier may correspond to block 200 as shown in FIG. 2: i.e., it may be a common or generic classifier, not specific to individual processing elements as, by contrast, is shown in FIG. 1.

In still further embodiments, as shown in block 405, code may be generated for implementing a distribution of the flow-specific data structures that is run-time adaptive, meaning that, while some initial distribution might be made, with or without the profiling information, this initial distribution could be changed during actual execution of the network processing code. In such an adaptive embodiment, frequency of accesses to flow-specific data structures could be monitored, and the distribution reconfigured, for example by reconfiguring a cache management system of the network processor, to distribute the workload more evenly if overuse or under-use of particular processing elements was detected. Additionally or alternatively, the classifier could be reconfigured to assign packets to processing elements according to an adaptive distribution.

As further shown in block 405, cache-management code to manage the local memories of respective processing elements may also be created by the code analyzer and modifier 301. For example, a local memory may be a cache of table entries, and the cache-management code may ensure that a table entry for a particular packet flow is in the cache, and if it is not, the cache-management code may retrieve the entry from the shared memory 102. The cache-management code may be needed because the local memory may not be large enough to contain the entire set of entries assigned to a particular processing element. However, because entries are still not shared among processing elements, there is still not contention for the entries in the shared memory, as an entry will still only be accessed by a single processing element.

Figure 5:
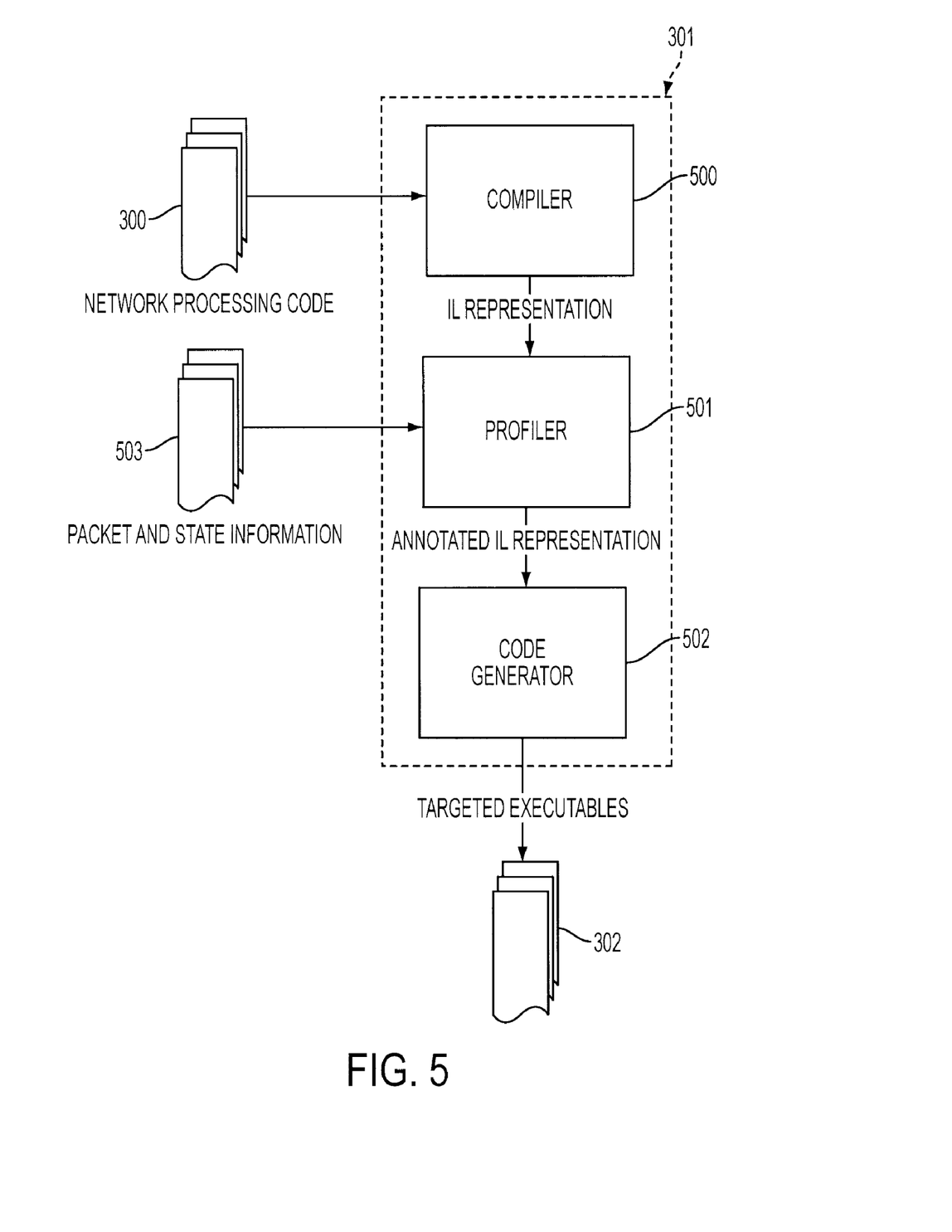
FIG. 5 shows one possible arrangement of software components according to embodiments of the invention.

FIG. 5 shows elements of one possible implementation of a code analyzer and modifier 301 according to embodiments of the present invention. In the embodiments, the code analyzer and modifier may comprise a compiler 500, a profiler 501, and a code generator 502. The compiler 500 may receive, as input, the network processing code 300, in the form of source code. As noted earlier, the source code may be written in a network processing domain-specific language (DSL). Such a DSL may be characterized by having table-related intrinsics, because tables are very commonly used in network processing. "Intrinsic" in this context means built into the language, such that an associated compiler has detailed knowledge about the intrinsic. In contrast, a compiler for a language such as "C" typically requires a programmer to specify details of constructing a table and does not recognize the semantics relating to how the table is accessed. In a network processing DSL, on the other hand, tables may be "first-class objects," meaning that detailed knowledge about the tables in a corresponding compiler (e.g., compiler 500) may be assumed, and need not be specified by a programmer. Accordingly, the compiler 500 may analyze the source code to detect language that creates data structures used in network processing, and to determine how the data structures are accessed. For example, the compiler 500 may recognize the label or keyword "table" as a structure with known characteristics, and recognize semantics in the DSL relating to how the table is accessed (e.g., the table is indexed by flow ID as mentioned above).

The compiler 500 may process the source code to convert it to an intermediate language (IL) representation. In particular, for example, the compiler may have knowledge of the semantics in the source DSL involving tables and table-related functions, and may accordingly interpret these semantics to generate constructs in the intermediate representation corresponding to accessing table entries. The intermediate representation may have a syntax which allows execution of the corresponding program to be readily simulated using simulation software.

The profiler 501 may receive, as input, the intermediate representation output by the compiler, and may further receive as input packet and state information 503. The packet and state information may be created, for example, by performing a "trace," i.e., data collection, during a representative period of actual processing seen on a network. The profiler 501 may include logic adapted to simulate execution of a program written in the intermediate representation. Using the intermediate representation and the packet and state information 503, the profiler may simulate execution of code corresponding to the intermediate representation, to generate profiling information. Included in the profiling information may be statistics regarding the frequency with which individual entries in a table are accessed during the simulated execution of the intermediate representation. This profiling information may be included in an "annotated" intermediate representation output by the profiler.

The code generator 502 may receive as input the annotated intermediate representation and form corresponding executable code. The code generator may also determine an initial distribution of flow-specific data structures among the plurality of processing elements of the network processor, using data structure access information from the annotated intermediate representation produced by the profiler. On the other hand, the code generator 502 need not use profiling information to determine an initial distribution; instead, the determination may be based on the analysis performed by the compiler 500.

The code generator 502 may also create classifier code corresponding to block 200, described above, for assigning flow IDs to and distributing arriving packets among processing elements. Additionally, the code generator 502 may create run-time adaptive code as discussed earlier, for monitoring processing at a network processor to determine if processing elements are under-utilized or over-utilized, and to reconfigure the initial distribution of flow-specific data structures among processing elements more equitably, based on the determination. The code generator 502 may output modified network processing code 302 in the form of "targeted executables"; that is, executable code configured for a particular network processor architecture.

Figure 6:
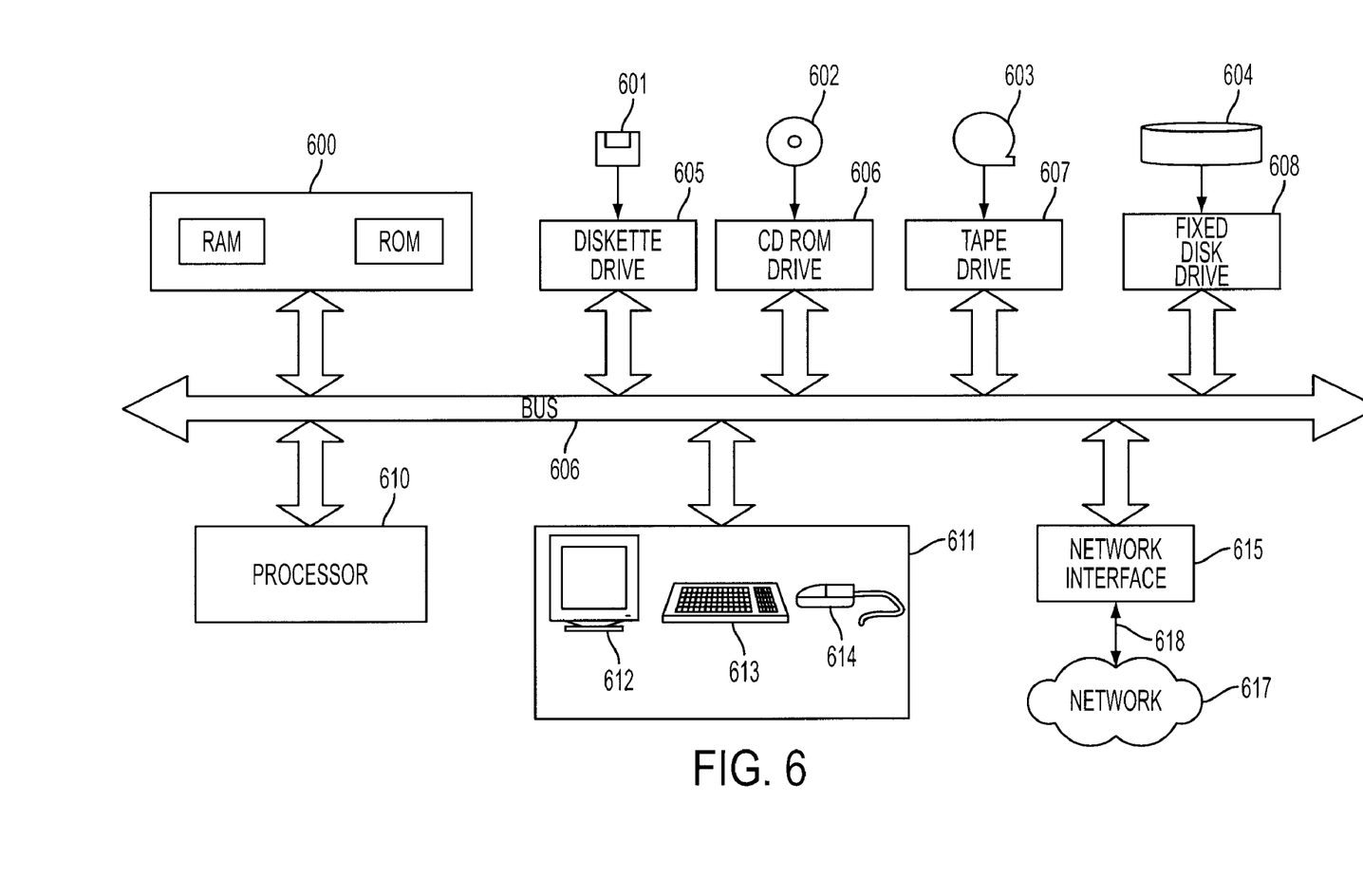
FIG. 6 shows an example of a system for practicing embodiments of the invention.

FIG. 6 shows a high-level representation of a computer system for implementing embodiments of the present invention, such as might be realized by a variety of known and commercially available hardware and software elements. The system comprises a memory 600 including ROM (Read-Only Memory) and RAM (Random Access Memory), processor 610 and user interface 611 comprising a video display 612, keyboard 613 and mouse 614. Elements may communicate via system bus 606. The system may further comprise a network 617 connected by a network medium 618 and network interface 615.

A computer program or collection of programs comprising computer-executable instructions for performing a method according to embodiments of the present invention may be stored and transported on computer-usable media such as diskette 601, CD-ROM 602, magnetic tape 603 and fixed disk 604. To perform the embodiments, computer instructions may be retrieved from the computer-usable media 601-604 using their respective drives 605-608 into memory 600, and executed by a processor 610. The functionality disclosed hereinabove for performing the embodiments may find specific implementations in a variety of forms, which are considered to be within the abilities of a programmer of ordinary skill in the art after having reviewed the specification.

In consideration of the foregoing, embodiments of the present invention may provide the following advantages:

if multiple threads execute on a processing element, an intra-processing locking mechanism can be employed; these mechanisms typically incur much less overhead than their corresponding inter-processor locking mechanisms;

if one thread executes on a processing element, then no locking of flow-specific data structures is necessary;

a simple, asynchronous write-back cache can be employed without worrying about multi-cache coherency issues, meaning that a less complicated, single-cache coherency algorithm can be employed;

packet processing overhead is ultimately reduced, improving the overall packet-processing rate;

faster local memory space is used more efficiently, with no duplication of data structure contents across processing element; and intelligent application-specific decisions can now be performed to equitably distribute the workload among the available processing elements, including making run-time decisions to re-partition if processing elements are underutilized or over-utilized.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method for automatically configuring network software, comprising:
   analyzing network processing code to detect and interpret language therein relating to data structures;
   determining a distribution of the data structures across respective local memories of a plurality of processing elements of a network processor such that data structures specific to a particular packet flow are assigned to the local memory of a single processing element;
   generating modified network processing code configured to use the distribution to process packets;
   generating run-time adaptive code to change the distribution of the data structures during execution of the modified network processing code, based at least in part on frequency of accesses to the data structures; and
   generating a classifier associated with the network processing code, the classifier being configured to distribute arriving packets to appropriate processing elements, based upon which corresponding local memory stores the flow-specific data structures associated with the flow to which a packet belongs.

2. The method of claim 1, wherein the network processing code comprises a domain specific language.

3. The method of claim 1, wherein the local memories are caches.

4. A method for automatically configuring network processing software, comprising:
   analyzing network processing code to detect and interpret language therein relating to data structures;
   generating profiling information for the network processing code, the profiling information including information relating to accesses to the data structures;
   using the profiling information, determining a distribution of the data structures across respective local memories of a plurality of processing elements of a network processor such that data structures specific to a particular packet flow are assigned to the local memory of a single processing element;

generating modified network processing code configured to use the distribution to process packets;

generating run-time adaptive code to change the distribution of the data structures during execution of the modified network processing code, based at least in part on frequency of accesses to the data structures; and generating a classifier associated with the network processing code, the classifier being configured to distribute arriving packets to appropriate processing elements, based upon which corresponding local memory stores the flow-specific data structures associated with the flow to which a packet belongs.

5. The method of claim 4, wherein (b) includes simulating execution of the network processing code.

6. The method of claim 4, wherein the network processing code comprises a domain specific language.

7. The method of claim 4, wherein the local memories are caches.

8. A method for automatically configuring network processing software, comprising:

providing code analyzer and modifier software configured to generate network processing software associated with parallel processing of a plurality of packet flows using a plurality of processing elements;

providing first network processing code to the code analyzer and modifier software as input;

executing the code analyzer and modifier software to form modified network processing code as output, the modified network processing code being configured to implement a distribution of packet-flow-specific data structures across respective local memories of the plurality of processing elements such that processing of each distinct flow of the plurality of packet flows is restricted to a single processing element;

generating run-time adaptive code to change the distribution of the data structures during execution of the modified network processing code, based at least in part on frequency of accesses to the data structures; and generating a classifier associated with the network processing code, the classifier being configured to distribute arriving packets to appropriate processing elements, based upon which corresponding local memory stores the flow-specific data structures associated with the flow to which a packet belongs.

9. The method of claim 8, wherein the code analyzer and modifier software is configured to analyze the first network processing code to detect and interpret language therein relating to data structures.

10. The method of claim 8, wherein the code analyzer and modifier software is configured to simulate execution of the first network processing code to generate profiling information for the first network processing code, the profiling information including information relating to accesses to data structures accessed by the first network processing code to process the packet flows.

11. The method of claim 8, wherein the code analyzer is configured to generate code for implementing a common classifier to distribute packets to appropriate processing elements.

12. A system comprising:
a memory including computer-executable instructions;
a processor coupled to the memory to execute the instructions, the instructions when executed implementing a process for automatically configuring network processing software, the process including:

analyzing network processing code to detect and interpret language therein relating to data structures;

determining a distribution of the data structures across respective local memories of a plurality of processing elements of a network processor such that data structures specific to a particular packet flow are assigned to the local memory of a single processing element;

generating modified network processing code configured to use the distribution to process packets; generating run-time adaptive code to change the distribution of the data structures during execution of the modified network processing code, based at least in part on frequency of accesses to the data structures; and generating a classifier associated with the network processing code, the classifier being configured to distribute arriving packets to appropriate processing elements, based upon which corresponding local memory stores the flow-specific data structures associated with the flow to which a packet belongs.

13. A system comprising:
a memory including computer-executable instructions;
a processor coupled to the memory to execute the instructions, the instructions when executed implementing a process for automatically configuring network processing software, the process including:

analyzing network processing code to detect and interpret language therein relating to data structures;

generating profiling information for the network processing code, the profiling information including information relating to accesses to the data structures;

using the profiling information, determining a distribution of the data structures across respective local memories of a plurality of processing elements of a network processor such that data structures specific to a particular packet flow are assigned to the local memory of a single processing element;

generating modified network processing code configured to use the distribution to process packets;

generating run-time adaptive code to change the distribution of the data structures during execution of the modified network processing code, based at least in part on frequency of accesses to the data structures; and generating a classifier associated with the network processing code, the classifier being configured to distribute arriving packets to appropriate processing elements, based upon which corresponding local memory stores the flow-specific data structures associated with the flow to which a packet belongs.

14. A machine-readable medium storing computer-executable code analyzer and modifier software configured to generate network processing software associated with parallel processing of a plurality of packet flows using a plurality of processing elements, the code analyzer and modifier software being adapted to receive first network processing code as input, and to form modified network processing code as output, the modified network processing code being configured to implement a distribution of packet-flow-specific data structures across respective local memories of the plurality of processing elements such that processing of each distinct flow of the plurality of packet flows is restricted to a single processing element, the modified network processing code being executing to generate run-time adaptive code to change the distribution of the data structures, based at least in part on frequency of accesses to the data structures, and generate a classifier associated with the first network processing code, the classifier being configured to distribute arriving packets to appropriate processing elements, based upon which corresponding local memory stores the flow-specific data structures associated with the flow to which a packet belongs.

15. The machine-readable medium of claim 14, wherein the code analyzer and modifier software is adapted to analyze the first network processing code to detect and interpret language therein relating to data structures.

16. The machine-readable medium of claim 14, the code analyzer and modifier software being further adapted to simulate execution of the first network processing code to generate profiling information for the first network processing code, the profiling information including information relating to accesses to data structures accessed by the first network processing code to process the packet flows.

* * * * *